March 14, 1967  R. E. WEBER  3,309,224
METHOD OF COATING PAPER WITH PIGMENTED PROTEIN CONTAINING
OIL-IN-WATER EMULSIONS HAVING EPOXY RESIN
DISPERSED IN OIL PHASE
Filed March 7, 1963

OIL AND UNCURED RESIN PHASE
PROTEIN PHASE

UNCURED RESIN

HARDENED PROTEIN-RESIN

United States Patent Office 3,309,224
Patented Mar. 14, 1967

3,309,224
METHOD OF COATING PAPER WITH PIGMENTED PROTEIN CONTAINING OIL-IN-WATER EMULSIONS HAVING EPOXY RESIN DISPERSED IN OIL PHASE
Robert E. Weber, Neenah, Wis., assignor to Kimberly-Clark Corporation, Neenah, Wis., a corporation of Delaware
Filed Mar. 7, 1963, Ser. No. 263,660
4 Claims. (Cl. 117—155)

This invention relates to coated paper of relatively light basis weight and which is particularly adapted for lithographic printing. More specifically, the invention relates to coated paper in which the coating has a cellular structure and is water resistant but wettable, and the binder of which coating is essentially protein.

Paper having a coating of a cellular structure derived from the expulsion or evaporation of an oil during the course of drying of a wet coating emulsion on a web and having protein as a binder or adhesive is described in the literature. The finely dispersed oil droplets from the coating composition are numerous and of such size that the cells resulting from the evaporation procedure have the capacity to provide for light scattering, that is, the cells extend throughout the coating and a major proportion of the cells are in the range of about ½ to 2 microns in average diameter.

I have found that such coatings, as those described above, which include protein as the major binder constituent, have very poor water resistance. This low resistance is such that, if the dried coated web is wetted slightly, the cells tend to collapse and only a very light pressure is needed to collapse the cells completely when they are in the wetted condition. Additionally, the usual water dispersible cross-linking agents, including the formaldehyde type resins, do not provide a degree of water resistance sufficient to prevent cell structure collapse when wetted.

I have now found that the cellular structure of protein binder coatings may be materially rigidified and made thoroughly satisfactory for lithographic as well as other printing work by the inclusion in the coating composition of a component or agent which reacts with and hardens the protein and, importantly, which coats the cell walls prior to the hardening action. In essence, I provide in the oil or disperse phase of the aqueous coating emulsion the agent which is reactive with the protein of the continuous phase; this agent, preferably a low molecular weight liquid epoxy resin, is dissolved or thoroughly dispersed in the oil prior to the incorporation of the oil in the coating composition. The oil, I have found, protects the resin from reaction with the protein while the composition is in the emulsion stage and until evaporation of the water and oil of the emulsion phases. However, when the oil has been evaporated and the web is in the dry state, the resin extends around the walls of the cells formed by the oil evaporation. Not only does the resin coat the cell walls but it penetrates the walls slightly and reacts with the protein or coating body to produce a uniform and rigid structure, both in the wet and in the dry state of the paper.

I have also found that it is essential for the purposes of my invention that the emulsion coating composition contain a mineral pigment. This pigment is necessary to permit adequate drying of the coating composition and complete evaporation of the oil phase. The pigment provides a degree of porosity in the coating which aids the escape of water in the drying stage; additionally, the pigment interrupts the continuity of the protein binder in the cell walls providing for permeation by the resin agent. Further, the pigment apparently tends to stabilize the emulsion itself as well as to add bulk to the coating composition. The usual pigments such as clay, calcium carbonate, titanium dioxide, or combinations of papermaking pigment are useful.

I have also found that it is necessary that the emulsion be broken during the drying stage and not prior thereto as such leads to the agglomeration of the constituents; breaking of the emulsion after the drying stage leads to an oil content in the paper web which is undesirable.

An important object of this invention is the provision of a novel method of producing protein-containing cellular paper coatings in which the protein is reacted with a hardening agent introduced into the disperse phase of the oil-in-water emulsion which is the coating composition.

It is another object of this invention to provide a novel method of coating paper with a composition comprising an emulsion which contains in the disperse oil phase a component reactive with a protein of the continuous phase but substantially inhibited from such reaction while the emulsion is in an unbroken state.

The resins which I have found most suitable for the purpose are those uncured epoxy resins which are soluble to some degree in the oil and which do not exhibit a high epoxide equivalent. By epoxide equivalent is meant the weight of the resin in grams which contains 1 gram equivalent of epoxide. Preferably, the epoxide equivalent of the materials for the invention is less than about 300 and are those which have the general formula:

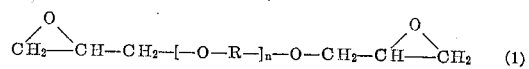

wherein R is a phenyl group, a bisphenol or a plurality of such groups as in:

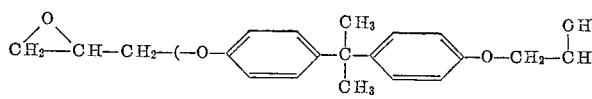 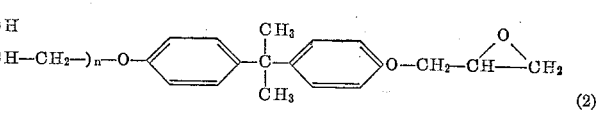

tinuous phase; this agent, preferably a low molecular weight liquid epoxy resin, is dissolved or thoroughly dispersed in the oil prior to the incorporation of the oil in the coating composition. The oil, I have found, protects the resin from reaction with the protein while the composition is in the emulsion stage and until evaporation of the water and oil of the emulsion phases. However, when the oil has been evaporated and the web is in the dry state, the resin extends around the walls of the cells formed by the oil evaporation. Not only does the resin coat the cell walls In the above formula n may vary from 0 to 3 but, for the purposes of this invention, a value of 0 to 2 is preferred. When n is 0, the product is a very fluid light colored material which is essentially the diglycidyl ether of bisphenol A:

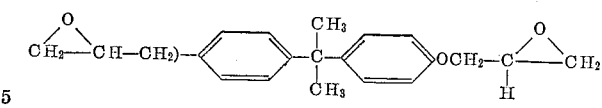

Also, resorcinol diglycidyl ether (1,3-bis-(2,3-epoxypropoxy)-benzene) having an epoxide equivalent of 128; a viscosity of 500 centipoises at 25° C.; and a specific gravity of .121 at 25° C. is suitable.

I have found, for example, that commercially produced resins such as Epon resin 812, a product of the Shell Chemical Company having an epoxide equivalent of 140 to about 160, is eminently suitable for the practice of the invention. This material has a viscosity at 25° C. of between about 0.9 to 1.5 poises and its use does not tend to materially thicken the emulsion. Also, Epi-Rez 510, a product of Jones-Dabney Company, a division of Devoe and Raynolds Company, Inc., and which is essentially a diglycid ether of bisphenol, is useful. Such resin has an epoxide equivalent of about 180–200, a specific gravity of 1.6, and exhibits a viscosity of about 10,000 to 16,000 centipoises at 12 r.p.m. with a No. 4 spindle on the Brookfield viscometer. Also, General Epoxy resins of General Mills, Inc. such as General Epoxy 175 having an equivalent weight of 175, a viscosity in centipoises of about 6400 maximum, and a specific gravity of 1.16, is suitable.

The oil in which the resin is dispersed must have a vapor pressure such that it does not vaporize materially under the drying conditions imposed until essentially all of the water of the continuous phase is volatilized. Such leads to the desired multiplicity of cells in the finished coating. Additionally, the oil should be such as to retain the hardening agent in dispersed form; for this purpose and for the purpose of providing a desirable oil phase for the two-phase compositions, the following are suitable: toluene; kerosene; fuel oils #1 and #2; petroleum distillate; and particularly those hydrocarbons having a flash point of 100° F. to 250° F.; such flash point, however, is not critical.

While the extent of the oil content is not critical to cell formation, the oil content bears a relationship to the pigment and protein binder content in order that the cells formed be numerous and provide uniform light reflectance from the finished coated web. For the purposes of this invention and based on an oil having a specific gravity of about 0.78, it is preferred that the protein to oil weight be from between about 1:1 to 1:2.25 and that the pigment to protein ratio be from about 1:1 to about 1:1.4.

The viscosity of the coating compositions is influenced by the solids content of the composition, the specific nature of the protein, and, to some extent, the hardening agent dissolved in the disperse phase. A solids content of about 25–40% by weight with a viscosity in the range of 5,000 to 18,000 centipoises, as measured on a Brookfield viscometer with a No. 6 or No. 7 spindle at 100 r.p.m. is satisfactory and particularly so when the coating application is by means of a blade or small diameter rotating rod as in trailing blade coating devices.

The wet coating composition is preferably dried relatively quickly on the paper web. A high velocity air blast directed to the fluid composition and at a temperature of 200° F. to 350° F. is suitable and dries the web in less than a second of exposure time. Accordingly, the procedure is adapted for on-the-machine coating operations; in such operation the first coating is applied to one side of the web and dried, the second side of the web is then coated, and also dried.

Evaporation of the oil and water is followed by the hardening reaction between the protein and resin. This may be effected by continued heating of the coated dried web or the hardening may take place at room temperature (70° F.) over a longer period of time.

The hardening action may take place before or after supercalendering of the web. Such supercalendering is effected while the web is dry and the structure in this state is resistant to the pressures imposed. Supercalendering is not required as the coating itself develops considerable brightness; however, light supercalendering improves the brightness characteristic.

The web to which the coating is applied preferably has a low basis weight but sufficient to withstand printing press operation although heavier webs may be coated with the composition beneficially if so desired. However, webs in the range of about 22 to 30 pounds basis weight (25" x 38" x 500 sheets) coated on each side with about 2 to 4 pounds (dry state) of the composition are desired as they exhibit high opacity, good brightness and provide the light weight sheets desired for many printing purposes. Thus, the paper permits reduction in mailing costs for example, while providing a printing surface equal to that of heavier basis weights.

The invention will be more fully understood by reference to the following detailed examples and accompanying drawings wherein.

Figure 1:
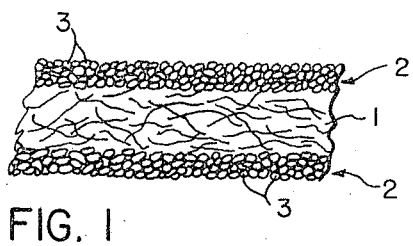
FIG. 1 is a greatly enlarged sectional view schematically illustrating the physical structure of a coating composition on a paper web in accordance with the invention.

Referring to the drawings initially, the numeral 1 in FIG. 1 designates a paper web to which a coating 2 has been applied on each web side. This coating 2 includes a large multiplicity of substantially contiguous voids or cells 3 created by the evolution of oil from the composition in the course of drying the composition on the web.

Figure 2:
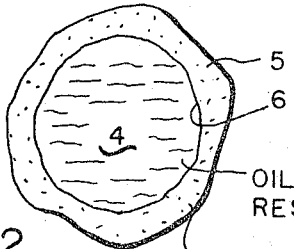
FIG. 2 is a further much enlarged, fragmentary view of a cell of the coating composition of FIG. 1 with the surrounding continuous phase indicated.
Figure 3:
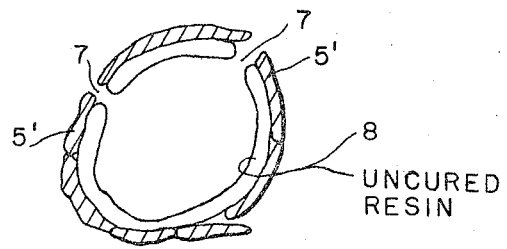
FIG. 3 is a view similar to that of FIG. 2 but illustrating the cell arrangement when the water and oil have been evaporated from the emulsion.
Figure 4:
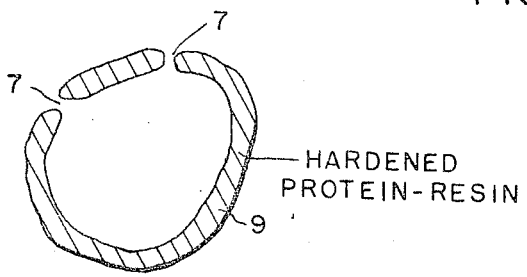
FIG. 4 is a view illustrating the cross-linked hardened cell structure.

As illustrated in further enlargement in FIG. 2, the cell 3 is formed in the coating body 2 by the evolution of oil from the disperse phase 4 (FIG. 2) of an emulsion having a continuous surrounding phase indicated at 5 and containing the protein as well as pigment. The phase interface is designated at 6 and upon evaporation of the aqueous medium of the continuous phase, the protein-pigment solidifies at this interface forming the cell 3. The solidified protein-containing phase is indicated at 5'. When the oil is evolved, fissures or crevices 7 through which oil is expelled are formed and the uncured resin, coming out of solution in the oil, is deposited around the cell walls at 8 (FIG. 3). Such resin apparently penetrates the wall to some extent, reacts with the protein, and thereby provides the hardened structure 9. The combination of close proximity of the cells and some resin penetration apparently provide for the uniform coating achieved on the paper web.

The invention is illustrated by the following detailed examples wherein the components are set forth in parts by weight.

*Example I*

100 parts of low viscosity soy protein and 100 parts of predispersed clay were dispersed in 400 parts of water. To this 6 parts of sodium hydroxide were added to the slurry to aid solubilization of the protein. The slurry was then cooked at 95° C. for 15 minutes with slow agitation. A creamy white, flowable mass resulted. In a second container 200 volumes of toluene (173 parts by weight) was placed along with 4 parts of oleic acid and with 5 parts of Epon resin 812 (a liquid epoxy resin and an aliphatic modification of Formula 2 in which $n=0$). On stirring this mixture all parts were completely dissolved and a homogeneous solution resulted. This oil solution was then added to the aqueous slurry of protein, clay and caustic with rapid agitation supplied by a Lightnin mixer. The agitation was continued for about 45 minutes, while cooling the mass to room temperature (20° C.) and forming the emulsion. This coating emulsion had a creamy white texture and a viscosity of approximately 10,000 centipoises at 40° C. at 100 r.p.m. with a No. 7 Brookfield spindle.

The coating was then applied (at 40° C.) to a 28-pound basis weight (25″ x 38″ x 500 sheets) publication grade base paper by means of a wire wound rod. This base sheet contained about 40% kraft pulp and 60% groundwood by weight. The coated sheet was thereafter immediately dried by directing a blast of high temperature air—about 300° F.—to the coated surface of the sheet. The coating is dried in less than about 1 second. The dry weight of the coating was approximately 3½ pounds (dry basis—one side) and showed about 7–8 points increase in G.E. brightness over that of the base sheet. General Electric base sheet brightness is about 67. At this time the coating exhibited no water resistance; that is, when wetted and subjected to light pressure, the cell structure collapsed resulting in a loss of the brightness and opacity of the coating. However, on allowing the sheet to age 24 hours at room temperature (68° F.), the coating developed water resistance so that, under the foregoing noted conditions, there was no collapse of cell structure and no loss in brightness or opacity to the sheet when the sheet was wetted.

The water resistance for this coating may also be developed more quickly by heating the coated paper at 250° F. for about 15 minutes.

Commonly, in production operations a web is coated first on one side and dried, and then coated on the other side and dried. This is followed by winding of the web in a tight roll; for supercalendering the web may then be unrolled and then rewound after supercalendering. Alternatively, a web may be supercalendered without winding after the web leaves the last of the coating machine driers. In either event the coated web of the invention, whether coated on one or both sides, is not affected adversely by the winding or supercalendering operations as long as it remains dry. Hardening by either storage for a period of time or heating may take place either before or after winding and before or after supercalendering. In either event, the web is preferably supercalendered dry and should contain less than about 5% moisture when supercalendered. Lightly supercalendering the described coating raises the gloss and improves the printing surface.

*Example II*

Example I is repeated but substituting the diglycidyl ether of bisphenol A as the epoxy resin to the extent of about 10 parts by weight. The result is as in Example I.

Other epoxy resins mentioned hereinbefore provide similar results when employed as described.

The hardening action of the epoxy resin by cross-linking with the amino groups of the protein does not adversely affect other desirable properties of the web. Nor, in the low resin concentrations employed, 2–20% by weight of the protein, does it apparently aid properties other than providing water resistance and improving rigidity.

The uncured epoxy resin itself need not be liquid but must be either soluble or colloidally dispersible in the oil and must be nonreacting with, as well as substantially insoluble, in the alkaline aqueous phase.

The solubilizing agent for the protein is preferably one which does not tend to interact with the hardening agent; thus, I prefer to avoid ammonia and to employ the alkali metal hydroxides, borax, and the like, as solubilizers.

The binder agent need not consist wholly of protein but may include a proportion of starch. However, I have found that the inclusion of modified starches, for example, increases the water sensitivity of the coating in proportion to the amount of starch incorporated. Generally, to reduce product cost, starch may be included to the extent of 50% of the binder weight where only a slight degree of water resistance is required. However, for practical lithographic printing purposes, the modified starch should not exceed 25% of the binder weight.

While I prefer to employ soya protein as the binder, other proteins commonly employed as constituents of paper coating compositions such as casein, animal glue, and vegetable and other animal proteinaceous materials are also useful. It is only necessary that, in the dry condition of the composition, the hardening agent be reacted with the amino groups of the proteinaceous binder to cross-link the protein and resin to thereby produce the desired stiffening and water resistant quality. An advantage of the method is that, since the product of the reaction is apparently homogeneous, the light reflectance is not subject to interference by refraction effects.

Paper, in accordance with the invention, normally coated on both sides and having a basis weight in the range of about 25–35 pounds, while adapted particularly for lithographic printing, is also useful generally as it exhibits good letterpress pick properties; good opacity (Bausch and Lomb 90–92); excellent fold resistance; and a G.E. brightness of at least 69–70.

It will be understood that this invention is susceptible to modification in order to adapt to different usages and conditions and, accordingly, it is desired to comprehend such modifications within the invention as may fall within the scope of the appended claims.

What is claimed is:

1. In the production of pigmented coated paper having a cellular structure and protein as the essential binder constituent, the steps of:
   (a) applying to a paper web a coating composition which is an oil-in-water emulsion, said emulsion having in the continuous aqueous phase dispersed mineral pigment and solubilized protein, said emulsion having in the discontinuous phase an oil of a lower vapor pressure than water and an uncured epoxy resin dispersed in the oil, said epoxy being reactive with the protein and present to the extent of between about 2% to 20% by weight of the protein and the ratio of protein to oil by weight being between about 1:1 to 1:2.25;
   (b) heating the web with the coating composition thereon to break the emulsion;
   (c) evaporating the water and oil by the heating step to dry the composition and produce a multiplicity of minute light dispersing cells in the coating composition on the web and to cause the epoxy resin to coat and penetrate the walls of the cells; and
   (d) reacting the epoxy resin with the protein on the dried web to strengthen the structure of the cell walls, harden the coating and provide for uniform light reflectance from the coated web.

2. In the production of pigmented coated paper having a cellular structure and protein as the essential binder constituent, the steps of:
   (a) applying to a paper web a coating composition which is an oil-in-water emulsion, said emulsion having in the continuous aqueous phase dispersed mineral pigment and solubilized protein, said emulsion having in the discontinuous phase an oil of a lower vapor pressure than water and an uncured epoxy resin dispersed in the oil, said epoxy being reactive with the protein and present to the extent of between about 2% to 20% by weight of the protein and the ratio of protein to oil by weight being between about 1:1 to 1:2.25;
   (b) heating the web with the coating composition thereon by directing an air blast at a temperature of between about 200° F. and 350° F. to dry the composition to produce a coating containing a multiplicity of minute light dispersing cells and having a relatively bright surface and to cause the epoxy resin to coat and penetrate the walls of the cells; and
   (c) reacting the epoxy resin with the protein on the dried web by carrying out the reaction at temperatures of between about 68° F. and 250° F. for a time varying inversely with the temperature, to strengthen the structure of the cell walls, harden the coating and provide for uniform light reflectance from the coated web.

3. The process as in claim 1 wherein the uncured epoxy resin dispersed in the oil of the discontinuous phase is a liquid.

4. The process as in claim 1 wherein the uncured epoxy resin is a low molecular weight epoxy having an epoxide equivalent of between about 140 and 300.

References Cited by the Examiner
UNITED STATES PATENTS

| | | | |
|---|---|---|---|
| 2,872,427 | 2/1959 | Schroeder | 117—155 X |
| 2,961,334 | 11/1960 | Clancy et al. | 117—36.7 |
| 3,108,009 | 10/1963 | Clancy et al. | 117—164 X |
| 3,192,171 | 6/1965 | Lambuth | 117—164 X |

WILLIAM D. MARTIN, *Primary Examiner.*

H. W. MYLIUS, M. LUSIGNAN, *Assistant Examiners.*